United States Patent
O'Connor et al.

(10) Patent No.: US 7,328,313 B2
(45) Date of Patent: Feb. 5, 2008

(54) METHODS TO PERFORM CACHE COHERENCY IN MULTIPROCESSOR SYSTEM USING RESERVE SIGNALS AND CONTROL BITS

(75) Inventors: Dennis M. O'Connor, Chandler, AZ (US); Michael W. Morrow, Morrisville, NC (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 11/094,687

(22) Filed: Mar. 30, 2005

(65) Prior Publication Data

US 2006/0224834 A1    Oct. 5, 2006

(51) Int. Cl.
*G06F 13/00* (2006.01)

(52) U.S. Cl. .................. 711/145; 711/143; 711/152

(58) Field of Classification Search ................ 711/145, 711/152, 143
See application file for complete search history.

(56) References Cited

U.S. PATENT DOCUMENTS

| | | | | |
|---|---|---|---|---|
| 5,561,780 A | * | 10/1996 | Glew et al. .................. | 711/126 |
| 5,729,712 A | * | 3/1998 | Whittaker .................... | 711/122 |
| 5,732,278 A | * | 3/1998 | Furber et al. ................. | 712/41 |
| 6,675,265 B2 | * | 1/2004 | Barroso et al. ............. | 711/141 |

* cited by examiner

*Primary Examiner*—Reba I. Elmore
(74) *Attorney, Agent, or Firm*—Schwegman, Lundberg & Woessner, P.A.

(57) ABSTRACT

A cache controller prevents the use of data in a write-back cache memory from being propagated except to a client asserting a reserve signal, if a first control bit is set, or until the data is backed-up in a main memory, if a second control bit is set. The control bits inhibit portions of the cache memory from being accessed until the control bits are reset.

4 Claims, 4 Drawing Sheets

METHODS TO PERFORM CACHE COHERENCY IN MULTIPROCESSOR SYSTEM USING RESERVE SIGNALS AND CONTROL BITS

BACKGROUND

The present subject matter pertains to core systems and, more particularly, to write-back cache in multiprocessor systems.

Multiprocessor systems that share data require coherency of data. That is, data must be the same for all processors. For both read and write operations, data read or written must be the same, or chaos may result.

In today's modern computer systems frequently used data is often "cached". This means that the data is stored in a fast-access cache memory instead of a relatively slower random access memory or main memory. This can introduce data coherency issues between main memory and the cache. As a result, the main memory must be updated from the cache memory. Some cache memories do not immediately write the data that has been changed back to the main memory. Cache memories that do not immediately update the main memory for changed data in the cache are called write-back cache memories.

A core may include one or more processors and one or more caches. Typically a core also includes a main memory that is slower acting as compared with the cache memories. A processor may output an address that indicates that the processor is looking for data. In a typical situation, the address is sent to the cache memory first. When the processor finds the data in the cache memory, it is called a cache "hit". When the processor does not find the data in the cache memory, it is called a cache "miss".

For a cache "miss" situation, a fixed-size block of data is typically obtained from the main memory and stored in the cache memory, because probabilities indicate that other data from this same block will probably be required soon.

DETAILED DESCRIPTION

Figure 1:
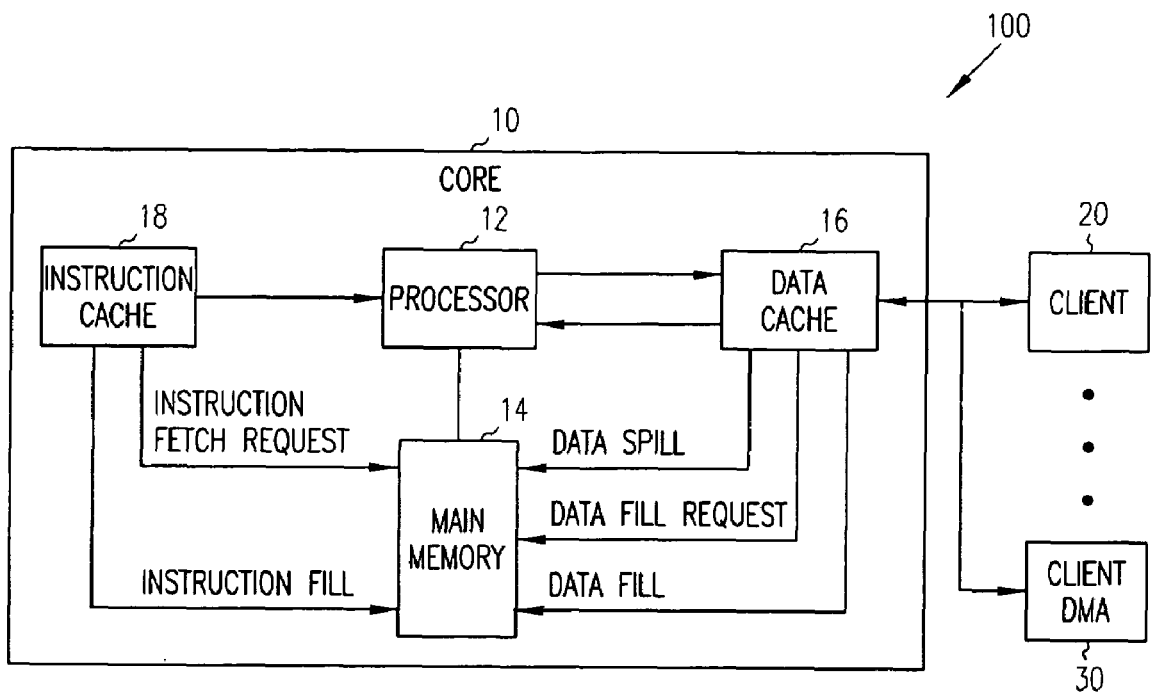
FIG. 1 is a block diagram of a core system in accordance with various embodiments of the present invention.

FIG. 1 is a block diagram of a core system 100 in accordance with various embodiments of the present invention. The core system may include a core 10 and external clients 20-30. Some of the external clients 20-30 may be other processors (not shown) within the same core 10. Other of the clients 20-30 may be non-processor entities, such as direct memory access (DMA) device (client DMA 30).

Core 10 may have at least one processor 12 to process data. Core 10 may include a main memory 14. Also included in core 10 may be one or more caches 16 and 18. Cache 16 is a data cache to store data for the processor. Cache 18 is an instruction cache to store processor instructions for specifying the operations that the processor 12 is to perform. Data cache 16 is coupled to processor 12 to support both read and write operations. Instruction cache 18 is coupled to processor for read operations to retrieve instructions for processor 12 to perform.

Main memory 14 is coupled to both data cache 16 and instruction cache 18 to provide slower acting memory for both data and instructions, respectively. Main memory 14 supplies instructions to instruction cache 18 in response to an instruction fetch request of cache memory 18. Main memory 14 provides data to data cache 16 memory in response to a data fill request from data cache memory 16.

Since data cache memory 16 is a write-back cache, data cache memory 16 will, when necessary, write-back or update main memory 14 with changed memory in data cache memory 16. The typical behavior of write-back caches is not to update main memory 14 until absolutely necessary. Therefore, changed lines of data in the data cache 16, for example, are called "dirty lines" until the main memory 14 is updated with any changes.

Lines in a cache memory may be of variable size, typically from 16 bytes to 128 bytes or greater per line. Each line has a tag that specifies the address of the data stored in that line. A cache memory may include hundreds or thousands of lines of data. Lines in a cache memory may be logically arranged in a variety of ways. In a fully associative cache, data from any address may be stored in any line of the cache. In a direct mapped cache, for each address there is only one line in the cache that can store data from a particular address. In a set associative cache, for each address there is a set of lines into which the data at that address can be stored.

As previously mentioned, clients 20-30 may be other processors or non-processors, such as DMAs, etc. At least one of the clients 20, for example, may provide an access request for data from data cache 16. Since data cache 16 is a write-back cache, the data of cache 16 is not always stored or backed-up into main memory 14. When another client such as a local processor (not shown) within core 10 or a client 20-30 outside of core 10 requests access to cache 16, the client processor 12 asserts a reserve signal and associated address in a request to cache memory 16. In some embodiments, the reserve signal and its associated address may be communicated on dedicated wires entering the core 10. In other embodiments, the reserve signal and its associated address may be a message sent on a shared bus.

The reserve signal informs the cache memory 16 that the data at the associated address is to be moved out of that cache memory 16. Until such time as the data is moved, the cache should not allow processor 12 to read from or write to that area of memory. This is done in order to provide memory coherency.

In an embodiment, cache 16 may react to the reserve signal by reading the tags of lines in cache 16 that might match the address associated with the reserve signal, and then comparing those tags to said reserve signal address. If a match is found, a no-touch bit associated with that line is set. Other lines in the cache may also be associated with that particular no-touch bit.

In another embodiment, cache 16 may react to the reserve signal by setting one or more no-touch bits, such that, for every line that might contain data from the address associated with the reserve signal, each has its associated no-touch bit set.

As an example implementation, cache memory 16 might be a set associative cache and might have one no-touch bit for each set of lines. Since any given address can only be cached in one set of a set associative cache, setting the no-touch bit for that set guarantees that all the lines that might be caching data from the address given in the reserve signal have their associated no-touch bit set.

In some embodiments, the no-touch bit might only be set if some line associated with that no-touch bit includes modifications that have not been propagated out to main memory. Such lines are called "dirty" lines. In such an embodiment, the cache 16 would invalidate the line (if any) that contained the data given in the reserve signal instead of setting a no-touch bit.

The no-touch bit stays set until the data specified in the reserve signal is evicted from the cache. This eviction may be postponed until some other operation or operations are complete, or until a necessary resource (such as a shared bus) is available. In some embodiments, multiple reserve requests with different associated addresses may be handled by cache 16 at any given time. When an eviction caused by a reserve signal occurs, the data at the address associated with the reserve signal is sent out of the cache to the requester, and it is removed from the cache 16. If no further evictions are pending for any of the lines associated with the no-touch bit that is associated with the just-evicted line, then that no-touch bit is reset.

In embodiments where the no-touch bit is set even when the reserve signal does not correspond to a dirty line in cache 16, "eviction" of the line may actually involve merely clearing the line, and it may not involve actually sending data out of the cache. In any event, the requestor that sent the reserve signal must be informed when the data at the address associated with the reserve signal is no longer in cache memory 16.

Core 10 includes processor 12, data cache 16 and instruction cache 18, which all may be implemented on a chip, in an embodiment. A chip is a semiconductor device. In other embodiments, processor 12, data cache 16 and instruction cache 18 may be implemented as a region of a chip or on a chip set. However, the implementation is not limited to these configurations.

Figure 2:
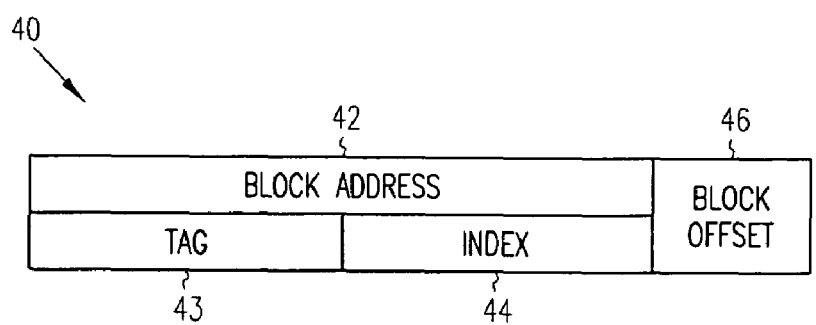
FIG. 2 is a layout diagram of a cache address scheme in accordance with various embodiments of the present invention.

FIG. 2 is a layout diagram of a cache address scheme in accordance with various embodiments of the present invention. Cache address 40 has a block address 42 and a block offset 46. In a set associative cache, block address 42 may have a tag portion 43 and an index portion 44. The cache address 40 is typically used to access data within a cache memory, such as data cache 16.

Figure 3:
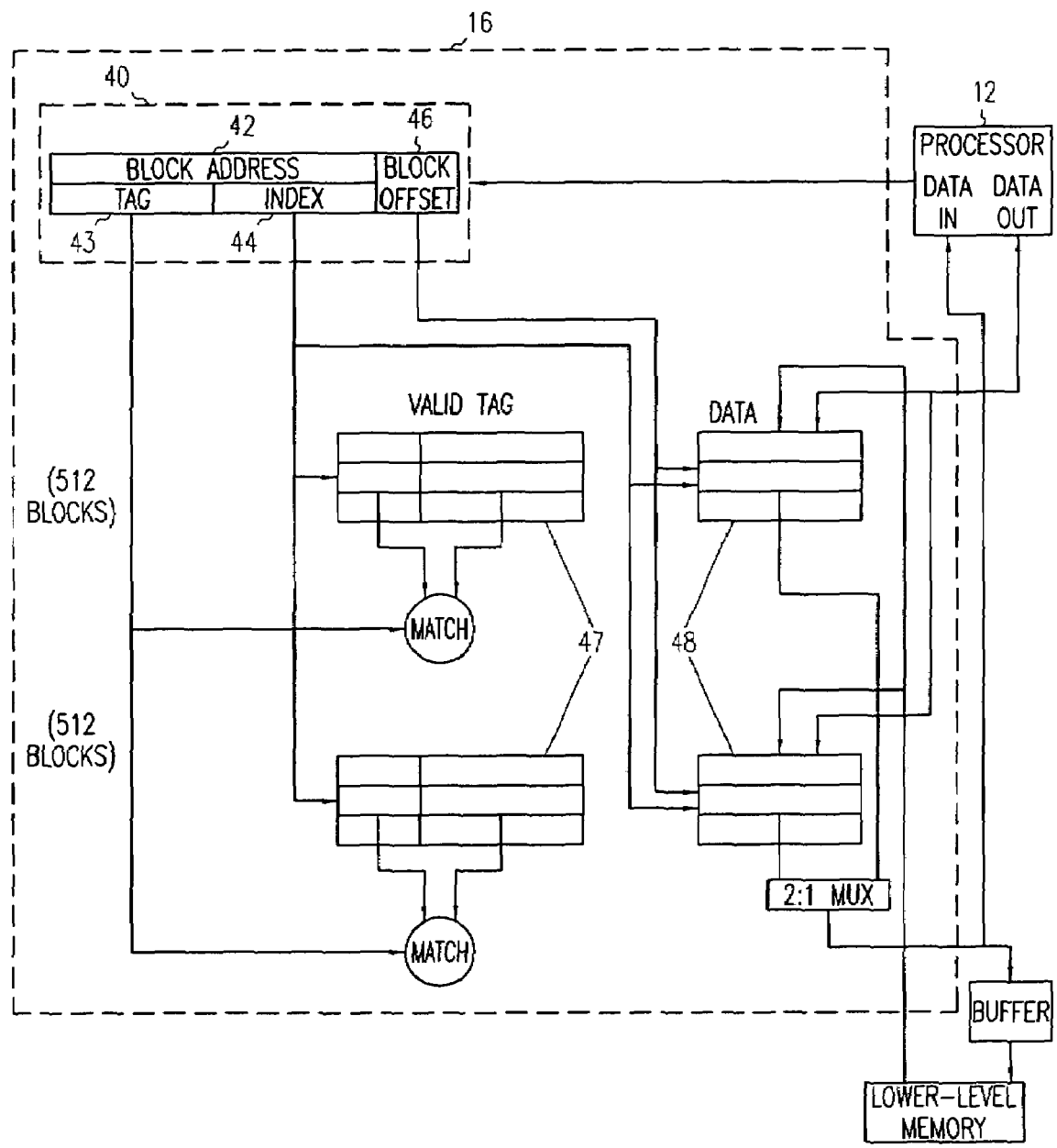
FIG. 3 is a block diagram of a cache memory access structure in accordance with various embodiments of the present invention.

FIG. 3 is a block diagram of a cache memory access structure in accordance with various embodiments of the present invention. Processor 12 outputs an address 40 to cache memory 16. As an example, the index portion 44 is used to select a tag from each of memories 47. The tags selected from memories 47 are then compared with the tag 43 sent by the processor. If one of the tags from memories 47 matches tag 43, a cache "hit" is indicated. The index 44 and block offset 46 are then used as an address to obtain the requested data from a corresponding one of data memories 48 to one of the tag memories that had the tag match. The data may be gated out from the corresponding one of data memories 48, buffered and read by the processor 12.

Figure 4:
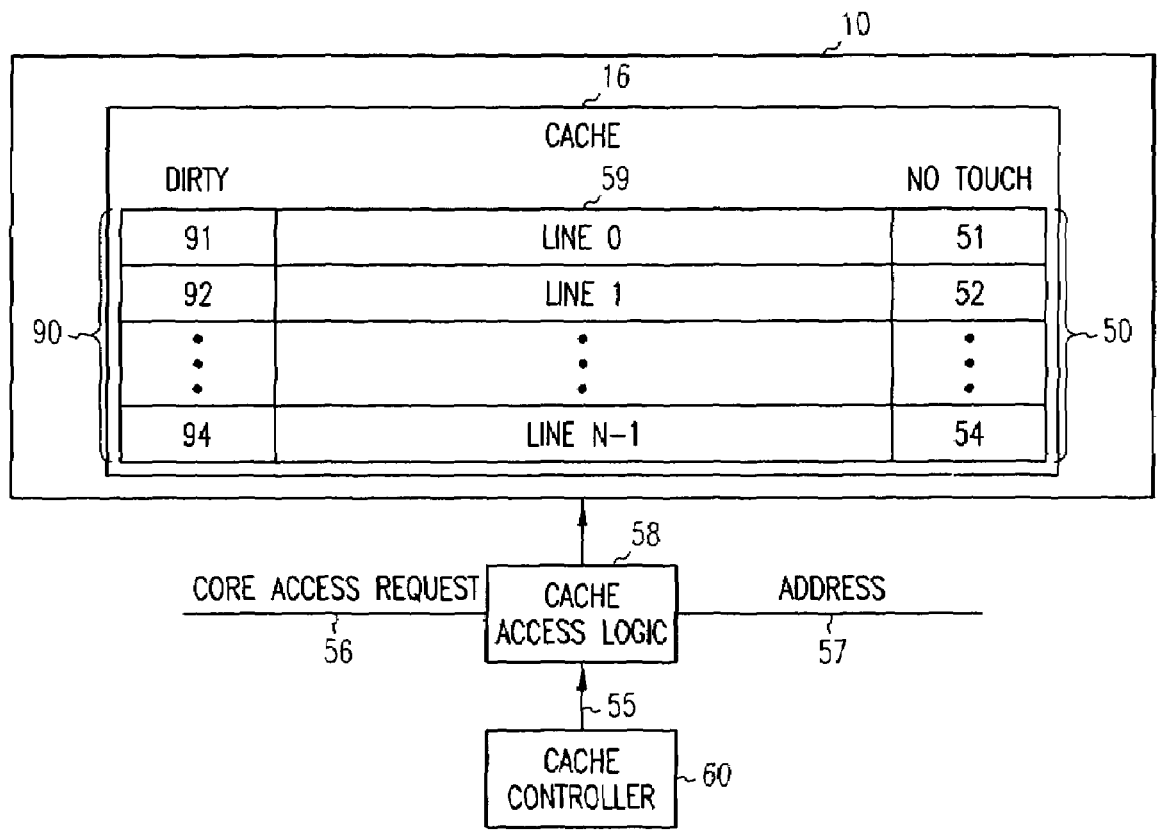
FIG. 4 is a block diagram of a portion of a cache controller in accordance with various embodiments of the present invention.

FIG. 4 is a block diagram of a portion of a cache controller in accordance with various embodiments of the present invention. Core 10 is depicted as including cache memory 16. Cache memory 16 has data storage 59. Data storage 59 has N lines of data (line 0, line 1, through line N-1) corresponding to no-touch bits 50 and dirty bits 90. No-touch bits 50 include a portion of the cache controller 60 that is explained further in FIG. 5. Cache controller 60 provides reserve signal 55 to cache memory 16 via cache access logic 58. Cache access logic 58 has inputs comprising a core access request 56 from the processor 12 and an address input 57 from the processor 12 or requesting client 20-30.

In an embodiment of the present invention, FIG. 4 depicts data line 0, data line 1, through data line N-1 corresponding respectively to no-touch bits 51, 52, through 54 and to dirty bits 91, 92, through 94. Lines in a cache memory may be of a variable size from 16 bytes to 128 bytes or greater per line. A block may be as many as several thousand lines of data. Many blocks of data may be stored within a set of the data cache memory 16. The no-touch bits 51, 52, and 54 may correspond to lines of data, blocks of data or sets of data. One no-touch bit may indicate that a request for data from an external agent has been made to as large an amount of data as a set. The dirty bits 91, 92 through 94 correspond to lines or portions of lines of data.

The no-touch bit indicates that some data has been requested by an external agent within the line, block or set of data that the no-touch bits 51 through 54 protect. No read or write access to the protected line, block or set of data will be allowed. As a result, the no-touch bit 51, 52, and/or 54 corresponding to a portion (line, block, set) of cache memory 16 prevents lines, blocks or sets of data from erroneously being read or modified in violation of the coherency requirements of the system.

When the line, block or set of main memory 14 has been evicted, the no-touch bit or bits 51-54 corresponding to the portion of cache memory 16 are reset. Clients 20-30 may then read the data from cache memory 16. When reserve signal 55 is asserted by the processor 12 of core 10, the appropriate no-touch bits 50 are set as previously described.

The dirty bits 91, 92, through 94, each indicate that some data in the portion of the cache to which the dirty bit correspond are different from the data at the corresponding location in main memory. The dirty bits are cleared when a line is loaded from main memory or evicted to main memory, and set when the processor modifies the corresponding area in the cache without modifying the corresponding locations in main memory.

Figure 5:
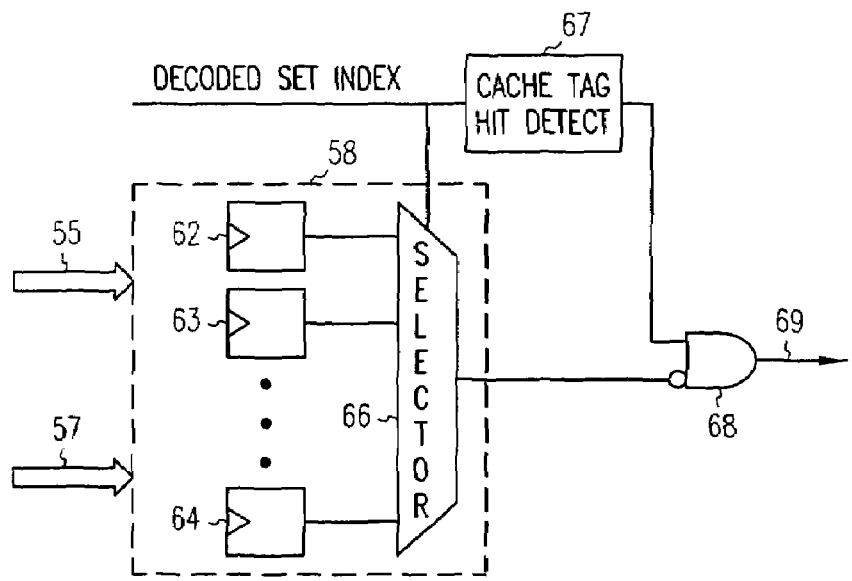
FIG. 5 is a block diagram of another portion of a cache controller in accordance with various embodiments of the present invention.

FIG. 5 is a block diagram of a cache controller 60 in accordance with various embodiments of the present invention. Cache controller 60 may include access logic 58 with an input reserve signal 55 and address 57 from the processor 12 or from a client 20-30. Cache controller 60 includes a set of latches 62, 63, through 64 that contain the no-touch bits. When reserve signal 55 is asserted by the processor 12, the no-touch bits are set as described above. When processor 12 tries to access data that may be in the cache memory 16 controlled by cache controller 60, processor 12 sends the set index of the address of the data, as shown in FIG. 3. The set index is decoded and selects the no-touch bit via selector 66. The output of selector 66 is combined with the output of the cache tag hit detect logic 67 using the AND NOT gate 68. The resulting hit signal 69 is asserted if and only if the data at the requested address is in the cache and if the no-touch bit 51-54 associated with that address is not set.

If the no-touch bit 51-54 associated with the address is set and even if the address is found in the cache 16, AND NOT gate 68 will output a reset signal on output 69 indicating a "miss" for the address was obtained. As a result, cache memory 16 will not grant the processor 12 access to the data, because the data is awaiting eviction. On the other hand, if the associated no-touch bits 51-54 were not set and the address was appropriate, AND NOT gate 68 will output a set signal on output 69, and processor 12 will be granted access to the data in the cache memory 16.

Figure 6:
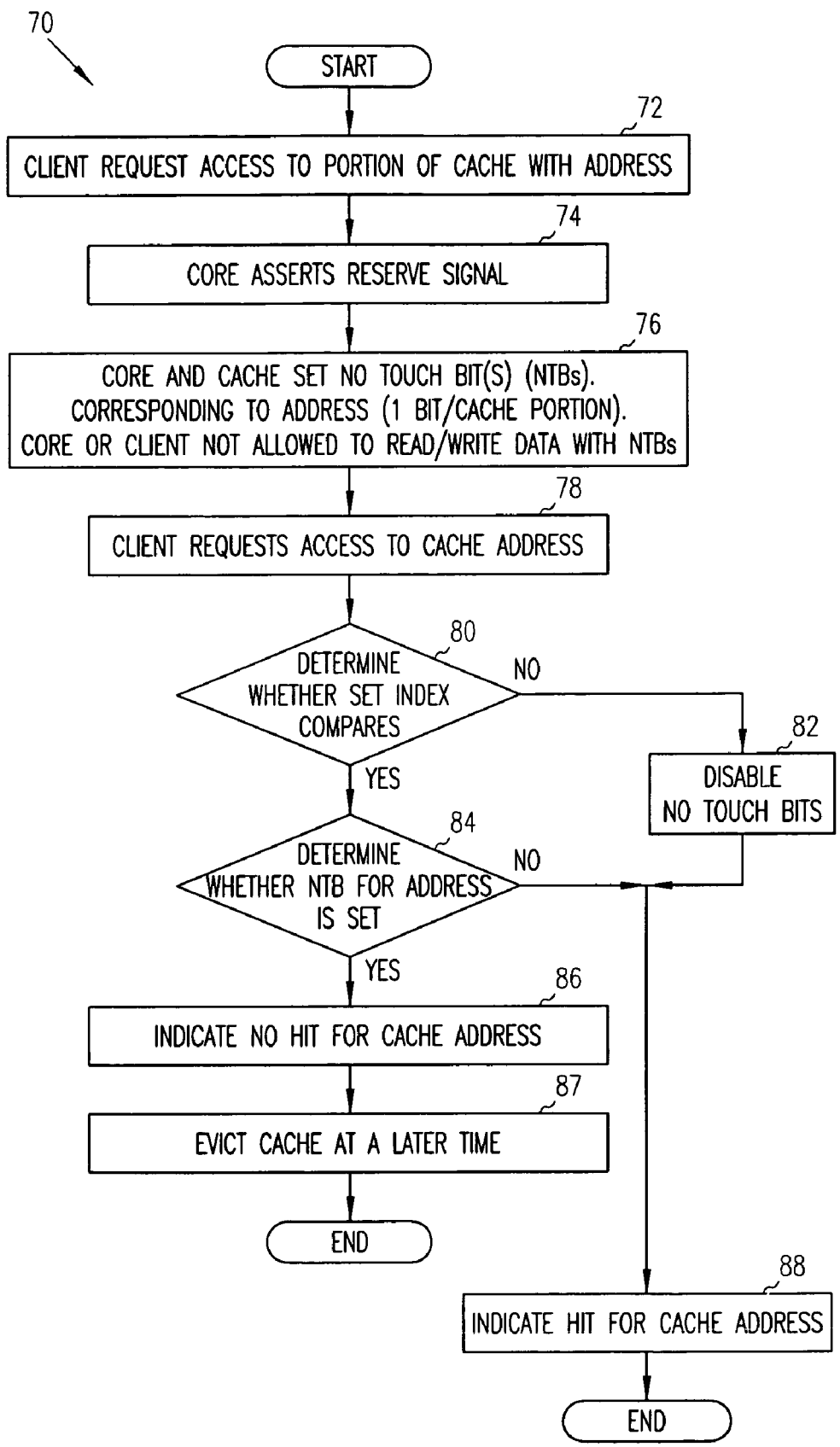
FIG. 6 is a flow chart of a cache control method in accordance with various embodiments of the present invention.

FIG. 6 is a flow chart of a cache control method 70 in accordance with various embodiments of the present invention. Previously processor 12 has set any no-touch bits 90 for the data 59 that it has modified. The method 70 is started, and block 72 is entered. A client 20-30 and/or processor 12 make an access request to the cache memory 16 to access a portion of the cache and supplies an associated address for the access, block 72.

The processor 12 of core 10, which controls the cache memory 16, asserts a reserve signal 55, block 74. This causes the no-touch bits 50 to be latched up by latches 62-64 of FIG. 5.

As previously mentioned, the core 10 in combination with the cache controller 60 have previously set any appropriate dirty bits 90 for changes made to any portions of the cache memory 16. One dirty bit 91-94 may be used to mark each portion of cache memory 16 that has been altered or changed. Portions may include lines or portions of lines in data 59. For example the no-touch bit may be organized to be one bit per line of data. The processor of core 10 or clients 20-30 are not allowed to read from or to write to the cache 16 any data for portions of the cache with no-touch bits set, block 76.

A client 20-30 may then request access to the cache memory 16, block 78.

The method 70 determines whether the set index compares with a part of the address supplied by the requesting client 20-30, block 80. If the set index and address do not match, block 80 transfers control to block 82 via the NO path. Selector 66 of FIG. 5 is disabled from outputting any no-touch bit information, block 82. Block 82 then transfers control to block 88.

If the set index and address match, block 80 transfers control to block 84 via the YES path.

The method 70 determines whether a no-touch bit 50 is set for the data included in the requested address, block 84. If none of the no-touch bits 50 for the address supplied by the requesting client 20-30 are set, block 84 transfers control to block 88 via the NO path.

If any of the no-touch bits 50 for the address supplied by the requesting client 20-30 are set, block 84 transfers control to block 86 via the YES path. A "no-hit" or a "miss" is indicated to the requesting client 20-30 for the cache address requested, block 86. The data is evicted at a later time after the data 59 has been backed-up into the main memory 14 if the dirty bit for the data is set, block 87. If the dirty bit for the data is not set, the data can be evicted without backing it up to main memory. Then the process is ended.

Block 82, as well as the NO path from block 84, transfers control to block 88. Output 69 of cache controller 60 of FIG. 5 indicates a "hit" for the particular cache address supplied by the client 20-30, block 88. The data address 57 has been found, and none of the associated no-touch bits 51-54 are set. The process is then ended.

It should be noted that the methods described herein do not have to be executed in the order described, or in any particular order. Moreover, various activities described with respect to the methods identified herein can be executed in serial or parallel fashion.

It will be understood that although "Start" and "End" blocks are shown, the method may be performed continuously.

As can be determined from the above explanation, the above-described methods and apparatus for cache coherency do not evict any erroneous data to clients. Since data is not evicted to main memory as often, power is conserved, and the overall time efficiency of the memory is improved. In addition, the various embodiments of the present invention may provide for particularly efficient operation for multiprocessor operations.

Although some embodiments of the invention have been illustrated, and those forms described in detail, it will be readily apparent to those skilled in the art that various modifications may be made therein without departing from the spirit of these embodiments or from the scope of the appended claims.

What is claimed is:

1. A method of providing cache coherency in a multiprocessor system, wherein the system comprises a core having at least one processor, a main memory, a cache controller, and at least one cache memory, and wherein the system further comprises at least one client, the method comprising:
   the at least one client making an access request to the at least one cache memory, wherein the access request comprises a reserve signal and an address corresponding to a line in the at least one cache memory;
   in response to the access request, the cache controller setting a no touch bit corresponding to the address in the at least one cache memory;
   the cache controller setting a dirty bit corresponding to the no touch bit if the contents of the requested address are modified without modifying a corresponding location in the main memory;
   in response to an access request by the at least one processor, determining if the no touch bit corresponding to the address is set and, if so, indicating a miss for the address in the cache memory;
   in response to an access request by the at least one client, determining if the dirty bit corresponding to the address is set and,
      if so, evicting the requested cache line to main memory, and resetting the dirty bit, and
      if not, evicting the contents of the requested address in the cache memory to the client; and
   resetting the no touch bit.

2. The method of claim 1 wherein the client comprises a direct memory access device not in the core.

3. The method of claim 1, wherein the client comprises a processor not in the core.

4. The method of claim 1, wherein the client comprises a processor in the core.

* * * * *